Oct. 18, 1927.

A. W. McLAUGHLIN 1,646,062

MOTOR BRACE

Filed March 15, 1926    2 Sheets-Sheet 1

INVENTOR:
Allen W. McLaughlin
BY David E. Carlsen
ATTORNEY

Oct. 18, 1927.

A. W. McLAUGHLIN 1,646,062

MOTOR BRACE

Filed March 15, 1926

INVENTOR:
Allen W. McLaughlin
BY David E. Carlsen.
ATTORNEY.

Patented Oct. 18, 1927.

1,646,062

UNITED STATES PATENT OFFICE.

ALLEN W. McLAUGHLIN, OF RIVER FALLS, WISCONSIN.

MOTOR BRACE.

Application filed March 15, 1926. Serial No. 94,815.

My invention relates to a device for reducing vibration of explosive type engines and thereby increasing the efficiency and reducing wear and tear on the engines. The device may also be called simply a motor brace and is particularly adaptable in automobiles having engines with the so-called three-point suspension.

Figure 2:
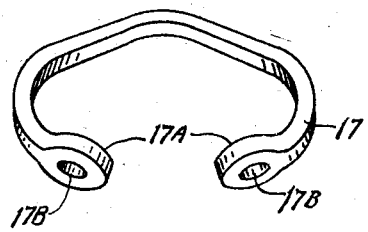
Fig. 2 is a perspective view of the uppermost clamp member 17 of my device adapted to be arranged on a fixed upper part of the engine.

Referring to the drawing by reference numerals $5^R$ and $5^L$ are respectively the right and left main frame members of an automobile and between which is mounted an engine of the explosive type of which are shown a cylinder head 6, cylinder block 7, crank-case 8, flywheel housing 9 and the usual timing-gear housing 10. 11 are the usual engine hanger brackets located near the rear end of the engine, usually at opposite sides of the fly-wheel housing and bolted as at 12 to the frame 5 and as at 13 to the engine. 14 is a forwardly extending bearing usually integral with the front end of the cylinder block and normally supporting the front end of the engine in a bracket under the front cross member of the main frame (not shown). This part 14 comprises the front bearing for the engine crank shaft 15 the forwardly protruding end of which is accessible for a starting crank. This type of engine is well known in the automobile industry, having three suspension points, namely the two opposite brackets 11 at the rear of the engine and the third suspension point at 14 at the lower front part of the engine. These three points of suspension are of course quite far apart and the two rear suspension brackets obviously hold the rear of the engine quite rigid to the frame. The front part of the engine having only the single suspension is at all times subject to considerable vibration caused by the vertically reciprocating motor parts and the side sway of the crankshaft and said parts being mostly at a higher elevation than the front suspension point 14.

My invention minimizes said vibration which is of course most pronounced at the highest point of the front part of the engine. In most automobile engines this highest point is at or near the front water outlet 16 from the engine and from which water circulates to the usual radiator.

17 is a clamp-like device adapted to be frictionally retained on the perimeter of the flange of said outlet 16. It has two downwardly and inwardly directed enlargements $17^A$ each with a bore $17^B$ to receive the upper end of a threaded rod 18. Thus the upper end of each said rod, within its bore $17^B$, engages the edge of the flange 16. These rods extend downwardly and outwardly away from each other and the lower end of each is slidably inserted and retained in the upper end of a tube 19. The lower portion of each said tube 19 is flattened or tapered as from $19^A$ to the lower extremity $19^B$ which frictionally engages preferably in the lower inside corner of one of the frame members 5 (see Fig. 1). The upper end of each tube terminates in spaced relation to the upper end of its rod 18. 20 are a pair of washers on each rod 18 spaced apart by a compression coil spring 21 about the rod, one of said washers in each pair bearing against the upper end of tube 19 and the other washer movable on the rod by means of a nut 22 on the threaded part of the rod and which is adjustable to vary the compression of each spring to forcibly impel the rod 18 upwardly and simultaneously impel the tube 19 downwardly. The rigid upper element 16 of the engine is thus under yielding upwardly and angularly directed pressure from both sides. It is obvious that side sway or vibration of the engine is thus reduced to a minimum.

Figure 3:
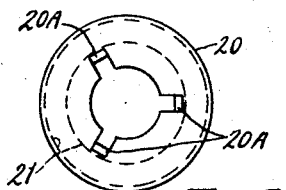
Figs. 3 and 4 are respectively a face view and an edge view of any one of a number of washers 20 used in my device.
Figure 4:
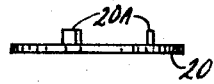

The washers 20 are shown in detail in Figs. 3 and 4, each washer having a number of circularly arranged lugs or fingers $20^A$ at one side to hold the end of spring 21 concentric to rod 18 and the bore of the washer.

Figure 1:
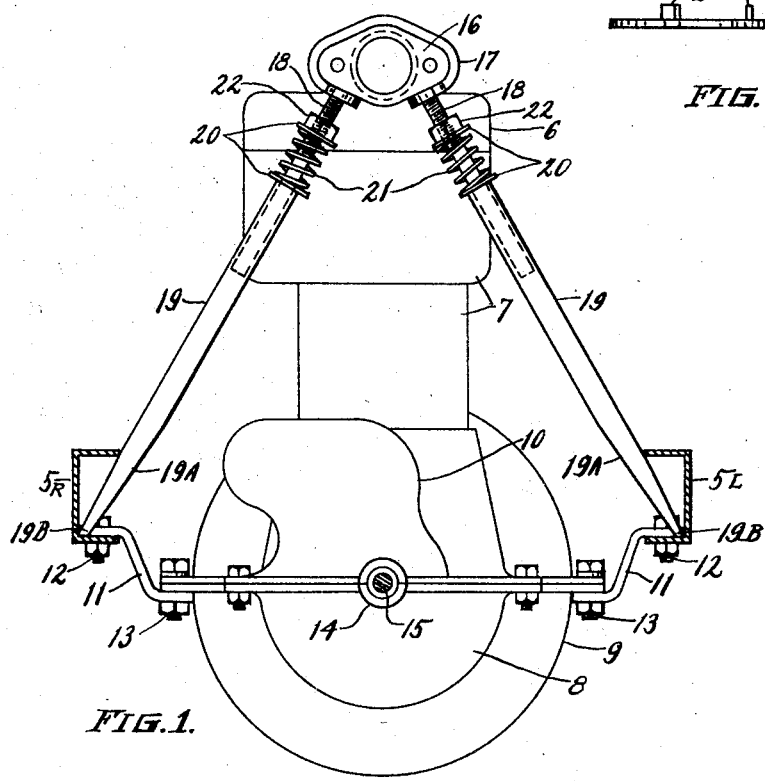
Fig. 1 is a front elevation of an automobile engine, parts of the adjacent main frame and my device in operative position.
Figure 5:
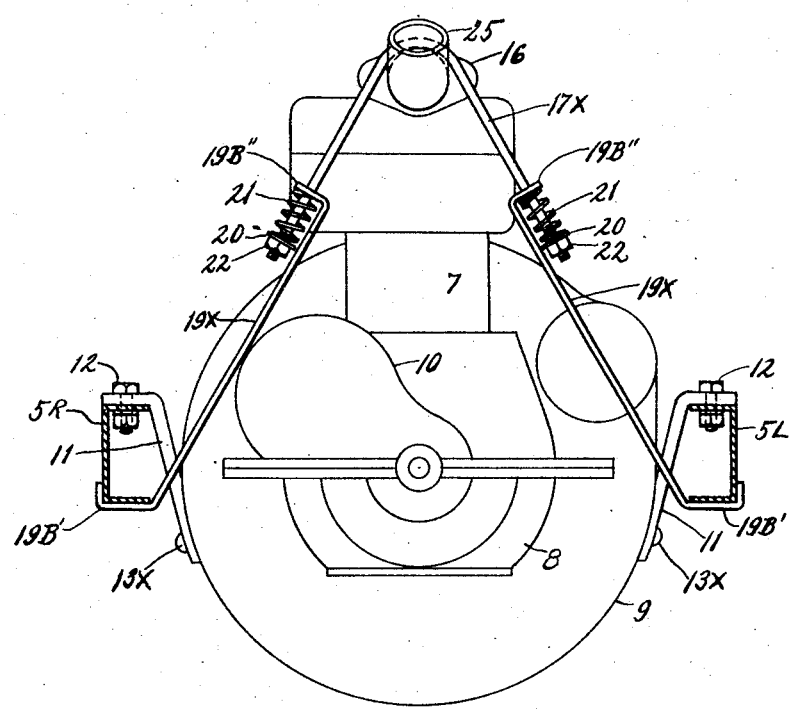
Fig. 5 is a front view of an automobile engine and my device in modified form.

In Fig. 5 I have shown a modified form of my device and in which parts similar to those in Fig. 1 are given like numbers with a suffix. In this form the member $17^X$ is simply a round bar of inverted V-shape and its ends threaded for the nuts 22. Instead of the tubular bars 19 flat bars $19^X$ are used, said bars hooked as at $19^{B'}$ to engage the under side of the main frames 5, thence extending upwardly and terminating in an outwardly directed ledge 19$^{B''}$ bored for slidable insertion of 17$^x$. The bar 17$^x$ simply rests on the outlet pipe 25 or engages any fixed part of the motor adjacent thereto and each of its ends protruding below ledge 19$^{B''}$ has the spring 21 about it and adapted to be compressed as desired between ledge 19$^{B''}$ and the washer 20 by nut 22. In this modified form it is readily seen that the principle of the device is unchanged except that bars 19$^x$ and 17$^x$ are at all times under tension of the compressed springs 21 instead of utilizing the spring compression for expanding parts 18 and 19 as in Fig. 1. It is also apparent that the inverted V-shaped arrangement of the bracing means will steady and increase the rigidity of the front end of the engine, most of which is above the single mounting.

What I claim is:

1. A vibration reducing device for a vertical engine mounted in three point suspension in a quadrangular frame, one of said points being in the lower front part of the engine and the other points at opposite sides of the rear part of the engine; said device comprising a yoke engaging the upper forward and central part of said engine and two telescopic brace members extending downwardly and outwardly from said yoke, in inverted V form, the lower end of each said brace adapted to frictionally engage said frame in spaced relation to the single engine suspension point and tension means on each said telescopic brace for yieldably supporting the said upper front part of the engine.

2. An engine brace for vertical engines having a single forward and central suspension between two parallel frame members, said brace comprising an upper inverted V-shaped yoke adapted to engage and straddle an upper and central part of the front end of the engine, the lower end of each said arm threaded and adapted to be slidably inserted through an apertured arm at the upper end of a parallel and lower brace member, the latter comprising a flat bar extending downwardly and outwardly and its lower extremity hooked upwardly to engage the under side of one of said frame members, a compression coil spring about the lower part of each said yoke arm and below said arm of the lower brace member, and a nut on said threaded part of each yoke adapted to compress its spring between it and said arm, to maintain yieldable tension between said frame members and the upper central part of the engine engaged by said yoke.

In testimony whereof I affix my signature.

ALLEN W. McLAUGHLIN.